US011964506B2

(12) United States Patent
Huber et al.

(10) Patent No.: US 11,964,506 B2
(45) Date of Patent: Apr. 23, 2024

(54) DYE-SUBLIMATION PAPER AND PRINTED DYE-SUBLIMATION PAPER

(71) Applicant: KOEHLER INNOVATION & TECHNOLOGY GMBH, Oberkirch (DE)

(72) Inventors: Christian Huber, Oberkirch (DE); Jürgen Leber, Lahr (DE); Tobias Sternbeck, Suwanee, GA (US)

(73) Assignee: Koehler Innovation & Technology GmBH, Oberkirch (DE)

( * ) Notice: Subject to any disclaimer, the term of this patent is extended or adjusted under 35 U.S.C. 154(b) by 0 days.

(21) Appl. No.: 17/864,619

(22) Filed: Jul. 14, 2022

(65) Prior Publication Data

US 2023/0032173 A1 Feb. 2, 2023

(30) Foreign Application Priority Data

Jul. 15, 2021 (DE) ........................ 102021118319.7

(51) Int. Cl.
*D06P 3/00* (2006.01)
*B41M 5/035* (2006.01)
(Continued)

(52) U.S. Cl.
CPC ............... *B41M 5/035* (2013.01); *D06P 3/52* (2013.01); *D06P 5/004* (2013.01)

(58) Field of Classification Search
CPC ...... B41M 5/035; B41M 5/502; B41M 5/508; B41M 5/41; B41M 2205/02; D06P 3/52; D06P 5/004
(Continued)

(56) References Cited

U.S. PATENT DOCUMENTS 4,421,515 A * 12/1983 Gorondy .............. G03G 9/0926 8/444
4,522,881 A * 6/1985 Kobayashi ........... B41M 7/0027 503/227
(Continued)

FOREIGN PATENT DOCUMENTS

| | | | |
|---|---|---|---|
| JP | 2010089393 | A | 4/2010 |
| JP | 2017185728 | A | 10/2017 |
| JP | 201824100 | A | 2/2018 |

OTHER PUBLICATIONS

European Search Report for Application No. 22184033.3, dated Jan. 9, 2023, 11 pages.
(Continued)

*Primary Examiner* — Eisa B Elhilo
(74) *Attorney, Agent, or Firm* — Lippes Mathias LLP

(57) ABSTRACT

The present invention relates to a dye-sublimation paper for printing with a solution containing at least one dye-sublimation dye, comprising a base paper having a first surface and a second surface opposite the first surface, characterised
in that the first surface is a hornified surface,
in that a further layer for binding and/or fixing the dye-sublimation dye is applied to the first surface, and
in that the dye-sublimation paper has a roughness on the coated side of ≤4.5 µm, measured according to ISO 8791-4, and a grammage of ≤30 g/m$^2$, measured according to ISO 536, and to a method for the production thereof, and to a dye-sublimation paper obtainable by this method.

20 Claims, 3 Drawing Sheets

(51) Int. Cl.
*D06P 3/52* (2006.01)
*D06P 5/28* (2006.01)

(58) Field of Classification Search
USPC .......................................................... 8/471
See application file for complete search history.

(56) References Cited

U.S. PATENT DOCUMENTS

| | | | | |
|---|---|---|---|---|
| 4,721,703 | A * | 1/1988 | Kobayashi ........... B41M 5/5254 | 503/227 |
| 5,160,505 | A * | 11/1992 | Seveno .............. D06B 11/0076 | 101/115 |
| 5,989,380 | A * | 11/1999 | Frischer ................... B41M 3/18 | 156/277 |
| 11,661,701 | B2 * | 5/2023 | Tsiarkezos ................ B32B 5/26 | 8/471 |
| 2009/0075075 | A1 * | 3/2009 | Abrams ................... D06Q 1/00 | 428/354 |
| 2018/0154666 | A1 | 6/2018 | Schmidt et al. | |
| 2018/0264864 | A1 | 9/2018 | Dentani et al. | |

OTHER PUBLICATIONS

Office Action for German Application No. 10 202 118 319.7, dated Apr. 5, 2022, 10 pages.

* cited by examiner

DYE-SUBLIMATION PAPER AND PRINTED DYE-SUBLIMATION PAPER

The present invention relates to dye-sublimation papers for printing with a solution containing at least one dye-sublimation dye, to a method for producing said papers, and to dye-sublimation papers obtainable by said method.

Dye-sublimation printing is an indirect printing process in which a dye-sublimation paper is printed (in a mirror image) usually using suitable sublimable dyes, the printed image then being transferred to the particular substrate material using a thermal transfer press in a transfer printing process by heating to up to 230° C. Sublimation routinely refers to the direct transition of the dyes from the solid to the gaseous state of aggregation, without the otherwise usual intermediate step in the liquid state. In textile printing, the motif is thus transferred to the substrate material with the sublimable dye. A prerequisite for this is that the dyes sublime at a sufficient speed in the range of about 170 to 230° C. and, for example, diffuse into the fibres of the textile and thus adhere well therein. Especially, disperse dyes are used, such as preferably azo dyes and anthraquinone dyes, which are usually insoluble in water. Especially, inkjet printers with special inks (inkjet inks) are used for sublimation printing.

The inkjet inks suitable for printing on such dye-sublimation papers are usually aqueous inks, in which the dye or pigment is preferably in the form of particles. The inkjet inks are preferably those containing water as the predominant liquid component, with the dye particles being dispersed in the aqueous phase. Thickeners may be added to such inks when the ink is further processed to a pasty mass, for example in a rotary screen printing process. Inkjet inks typically contain dye particles or pigment particles in the order of magnitude of about 0.05 to 1 μm, especially 0.2 to 1 μm, in practical applications expediently 0.2 to 0.3 μm.

After transferring the motif onto the material to be printed, preferably no inking should be felt thereon, as the ink evaporates completely into the printed material.

The advantages of dye-sublimation printing are mainly seen in the fact that different materials can be printed with photo quality, the costs are comparatively low, and environmental compatibility is improved. Binding agents and solvents, which may be present in the fibres in other printing processes and have to be washed out, can be dispensed with. In addition, the print is very resistant to UV radiation and other environmental influences. The advantages of dye-sublimation printing lie in the very good print result, which is also visible but hardly noticeable in terms of the feel of the product. In addition, all images, graphics and photos can be used. All in all, dye-sublimation printing is also favourable for single items. Compared to the advantages mentioned above, the disadvantages of dye-sublimation printing in relation to comparative processes are of only secondary concern.

Dye-sublimation papers are known in principle from the prior art.

It has become apparent, however, that known dye-sublimation papers are in need of further improvement. Especially, there is a need for improvement with regard to economic efficiency, for example through lower raw material costs due to low grammage and associated low transport costs, although good print results with regard to the printability of the dye-sublimation paper and also the transfer of the printed image should be maintained at the same time. In addition, the dye-sublimation paper should be distinguished by maximum utilisation of the applied ink, should be compatible with high printing speeds, and should have the fastest possible ink drying.

This aim has surprisingly been addressed by a dye-sublimation paper according to claim 1 and alternatively by a dye-sublimation paper according to claim 15.

Such dye-sublimation papers are characterised especially in that a porous paper is closed at the surface by the hornification of a surface or by the application of a coating to bind and/or fix the dye-sublimation dye on one side in order to hold the dyes and pigments on this surface, while at the same time allowing the solvent (water) in the inks to escape downwards. This allows for a cost-effective alternative to higher grammage papers, even at low grammage weights, while maintaining good printability and transfer quality.

At the same time, the low grammage of such dye-sublimation papers explicitly qualifies them for applications in which the dye-sublimation papers are printed using a printer and then sent to a processor for transfer, for example onto a textile, especially by air freight.

With the dye-sublimation papers according to the invention, it is also possible to achieve a good print image in all print thicknesses (half-tone, full-tone), good contour sharpness, high colour brilliance, high colour density and a uniform, linear colour gradient, which is similar to dye-sublimation papers with a higher grammage or to dye-sublimation papers with additional coatings. This can be made possible together with a low ink requirement due to a very good transfer rate (ink utilisation, low ink loss in the base paper).

Furthermore, the dye-sublimation papers according to the invention allow printing at higher speeds and are characterised by fast ink drying.

In a first aspect, the present invention relates to a dye-sublimation paper for printing with a solution containing at least one dye-sublimation dye, comprising a base paper having a first surface and a second surface opposite the first surface, characterised

- in that the first surface is a hornified surface,
- in that a further layer, for binding and/or fixing the dye-sublimation dye, is applied to the first surface, and
- in that the dye-sublimation paper has a roughness on the coated side of ≤4.5 μm, measured according to ISO 8791-4 (2008-05), and a grammage of ≤30 g/m$^2$, measured according to ISO 536 (2020-05).

Preferably, the roughness of the coated side is from 3.0 to 4.5 μm.

The dye-sublimation paper according to the invention is further preferably characterised in that the second surface has a roughness of >6 μm (measured according to ISO 8791-4 (2008-05)).

The second surface is preferably not hornified.

Preferably, the roughness of the second, preferably non-hornified surface is from 6 to 7.2 μm.

The roughness (also coarseness or abrasiveness) is a term from surface physics that describes the unevenness of a surface height.

Unless otherwise stated, roughness is measured according to ISO 8791-4 (2008-05).

Hornification is usually understood to mean an irreversible change in the cellulose fibres in the paper, for example by means of drying, pressure and dwell time, preferably on set-ups equipped with a Yankee cylinder. Alternatively, however, other drying cylinders can also be used for this purpose. In this process, the individual fibres may collapse and form internal hydrogen bonds that cannot be dissolved again without mechanical treatment. This results in papers that have a very high smoothness on one upper side, but a significantly lower smoothness on the opposite upper side.

It has been shown that the base paper, which is preferably relatively porous, by way of the hornification of the first surface, can be largely closed at the surface on this side in order to hold on this surface the applied dyes or pigments contained in the inks, although at the same time the solvent (usually water) contained in the inks can escape downwards. This effect is especially advantageous with the specified roughnesses.

The dye-sublimation paper according to the invention is further preferably characterised in that the first surface has a roughness of ≤4.5 μm, measured according to ISO 8791-4 (2008-05).

Preferably, the roughness of the first surface is from 3.0 to 4.5 μm (measured according to ISO 8791-4 (2008-05)).

The dye-sublimation paper according to the invention is further preferably characterised in that the further layer on the first surface has a thickness that is as uniform as possible. The relative variation in the thickness of the layer is preferably ±100% and more preferably ±50%.

The dye-sublimation paper according to the invention is further preferably characterised in that the base paper has a Cobb 60 according to ISO 535 (2014-06) of <25 g/m$^2$ measured on the smooth side, but preferably a Cobb between 16.5 and 22 g/m$^2$.

The dye-sublimation paper according to the invention is further preferably characterised in that the dye-sublimation paper has a Bendtsen porosity of ≤500 ml/min, measured according to 1505636-3 (2013-11).

Preferably, the porosity according to Bendtsen is 90-260 ml/min for dye-sublimation papers with a grammage between 17-28 g/m$^2$, and 150-350 ml/min for dye-sublimation papers with a grammage between 29-40 g/m$^2$.

The dye-sublimation paper according to the invention is further preferably characterised in that the base paper has a Bendtsen porosity of >500 ml/min, measured according to ISO5636-3.

Base papers that are smooth on one side and have such porosities have the advantage that the solvent contained in the inks can be absorbed well and at the same time the dyes and pigments are kept on the surface due to the surface smoothness on one side.

The dye-sublimation paper according to the invention is further preferably characterised in that the base paper has a grammage of 17 to 30 g/m$^2$.

Preferably, the grammage of the base paper is from 25 to 29.9 g/m$^2$.

Such a grammage is especially advantageous for transport, especially by air freight.

The dye-sublimation paper according to the invention is further preferably characterised in that the dye-sublimation paper has a breaking length of l/q of 6000-13000/3000-8000 (m), preferably of 9000-12000/4000-7000, at 25 g/m$^2$.

The dye-sublimation paper according to the invention is further preferably characterised in that the dye-sublimation paper has a breaking length of l/q of 6000-13000/3000-8000 (m), preferably of 9000-12000/4000-7000, at 30 g/m$^2$.

The dye-sublimation paper according to the invention is further preferably characterised in that the dye-sublimation paper has a breaking length of l/q of 6000-13000/3000-8000 (m), preferably of 9000-12000/4000-7000, at 35 g/m$^2$.

The breaking length is determined, for example, according to ISO 1924-1 (1992-10).

Such breaking lengths are advantageous because the breaking length describes a strength value of the paper and the papers must be distinguished by high strengths even at low grammage weights. This is necessary in order to be able to use the paper without difficulty in the printing and finishing processes. For example, no wrinkles may form in rotary printing processes or transfer papers by means of transfer calenders, and the paper must be able to withstand the corresponding pulling forces that can act on papers during processing, even at low grammage.

The dye-sublimation paper according to the invention is further preferably characterised in that the base paper has a burst pressure (Mullen) of greater than 60 kPa, preferably from 100-160 kPa, at 25 g/m$^2$.

The dye-sublimation paper according to the invention is further preferably characterised in that the base paper has a burst pressure (Mullen) of greater than 85 kPa, preferably of 110-170 kPa, at 30 g/m$^2$.

The dye-sublimation paper according to the invention is further preferably characterised in that the base paper has a burst pressure (Mullen) of greater than 97 kPa, preferably of 130-200 kPa, at 35 g/m$^2$.

The burst pressure (Mullen) is determined here, for example, according to ISO 2758 (2014-12).

Such a burst pressure (Mullen) is advantageous because the burst pressure describes a strength value of the paper and the papers must be distinguished by high strengths even at low grammage weights. This is necessary in order to be able to use the paper without difficulty in the printing and finishing processes. For example, no wrinkles may form in rotary printing processes or transfer papers by means of transfer calenders, and the paper must be able to withstand the corresponding pulling forces that can act on papers during processing, even at low grammage.

The dye-sublimation paper according to the invention is further preferably characterised in that the base paper is a sized paper, that contains, in its mass and/or at its surface, at least one sizing agent selected from the group comprising resin size, alkenyl succinic anhydride (ASA), alkyl ketene dimer (AKD), alkenyl ketene dimer (AnKD) and/or synthetic sizing agent based on styrene acrylate, styrene methacrylate, other acrylate copolymers or pure acrylate, or styrene maleic anhydride, or acrylonitrile, or diisobutene, whether anionic or cationic or amphoteric.

Preferably, alkyl ketene dimer (AKD) is contained as a sizing agent.

The dye-sublimation paper according to the invention is further preferably characterised in that the further layer present on the first surface comprises at least one barrier component and/or a pigment.

The dye-sublimation paper according to the invention is further preferably characterised in that the further layer present on the first surface comprises or consists of at least one barrier component selected from the group comprising starch, modified starch, starch derivatives, chemically and physically modified starch, carboxymethyl cellulose, cellulose derivatives, polyvinyl alcohol, polymers from the substance class of vinyl acetate polymers, or other effective constituents suitable as a barrier.

The dye-sublimation paper according to the invention is further preferably characterised in that the further layer present on the first surface comprises or consists of pigments, especially inorganic pigments, such as silica or clay.

The dye-sublimation paper according to the invention is further preferably characterised in that the further layer present on the first surface comprises at least one barrier component as defined above and at least one pigment as defined above.

The use of starch is especially preferred.

The pigments may include porous or non-porous pigments.

The barrier component is preferably contained in this layer in the form of the above-mentioned polymers, especially in the case of starch derivatives or starches as well as polyvinyl alcohol, preferably in an amount of 80 to 100 wt. %, in relation to the total weight of the additional layer.

The barrier component is preferably contained in this layer in the form of the above-mentioned pigments, preferably in an amount of 20 to 40 wt. %, in relation to the total weight of the additional layer.

The advantage of such a further layer, comprising a barrier component, is that even without conventional coating pigments, high colour densities and brilliant prints can be achieved in conjunction with the smooth/hornified upper side, which is located under the barrier component.

The advantage of such an additional layer, comprising a pigment, is that, due to the smooth/hornified surface, which is located under the pigment layer, high ink densities, very good ink drying, and exact, sharp-edged image reproductions can be achieved with little pigment coating compared to conventional dye-sublimation papers, as can be realised comparatively only using conventional, highly coated dye-sublimation inkjet papers.

The dye-sublimation paper according to the invention is further preferably characterised in that the areal application weight of the further layer present on the first surface is 0.2 to 12 $g/m^2$, preferably 0.5 to 5 $g/m^2$.

Such an areal application weight has the advantage that the total weight of the paper is relatively low and thus supports the competitiveness of the product in the market. Furthermore, the manufacturing costs can be reduced with a smaller coating application.

The dye-sublimation paper according to the invention may also comprise further layers either on the second surface of the base paper and/or on the surface of the further layer.

The dye-sublimation paper according to the invention is preferably distinguished by the fastest possible ink drying.

The present invention further relates to a method for producing a dye-sublimation paper, especially as described above for the first aspect, comprising the steps of one-sided smoothing and hornification of a first surface of a base paper, preferably by means of drying cylinders, wherein the use of a Yankee cylinder is preferred, but alternatively hot-drying cylinders or a plurality of drying cylinders connected in succession may be used, and by applying a further layer, for binding and/or fixing a dye-sublimation dye, to said first surface.

In this regard, all definitions and preferred embodiments for the dye-sublimation paper according to the first aspect also apply to the method described above.

The present invention further relates to a dye-sublimation paper obtainable by the method described above for the first aspect.

In a second aspect, the present invention relates to a dye-sublimation paper for printing with a solution containing at least one dye-sublimation dye, comprising a base paper having a first surface and a second surface opposite the first surface, characterised in that the first surface has a coating for binding and/or fixing the dye-sublimation dye, and in that the dye-sublimation paper has a roughness on the coated side of ≤4.5 μm, measured according to ISO8791-4, and a grammage of ≤30 $g/m^2$.

All definitions and preferred embodiments for the dye-sublimation paper according to the first aspect also apply analogously for the dye-sublimation paper according to the second aspect.

Preferably, the roughness on the coated side is from 3.0 to 4.5 μm, measured according to ISO 8791-4.

Preferably, the second surface has a roughness of >6 μm, measured according to ISO 8791-4.

Preferably, the roughness of the second surface is from 6 to 7.2 μm measured according to ISO 8791-4.

Preferably, the dye-sublimation paper has a Bendtsen porosity of <500 ml/min, measured according to ISO5636-3.

The base paper preferably has a grammage of 17 to 30 $g/m^2$.

Preferably, the grammage of the base paper is from 25 to 29.9 $g/m^2$.

Such a grammage is especially advantageous for transport, especially by air freight.

Preferably, the first and/or the second surface of the base paper are not hornified.

The dye-sublimation paper according to the invention is further preferably characterised in that the dye-sublimation paper has a breaking length of l/q of 6000-13000/3000-8000 (m), preferably of 9000-12000/4000-7000, at 25 $g/m^2$.

The dye-sublimation paper according to the invention is further preferably characterised in that the dye-sublimation paper has a breaking length of l/q of 6000-13000/3000-8000 (m), preferably of 9000-12000/4000-7000, at 30 $g/m^2$.

The dye-sublimation paper according to the invention is further preferably characterised in that the dye-sublimation paper has a breaking length of l/q of 6000-13000/3000-8000 (m), preferably of 9000-12000/4000-7000, at 35 $g/m^2$.

The breaking length is determined here, for example, according to ISO 1924-1 (1992-10).

Such breaking lengths are advantageous because the breaking length describes a strength value of the paper and the papers must be distinguished by high strengths even at low grammage weights. This is necessary in order to be able to use the paper without difficulty in the printing and finishing processes. For example, no wrinkles may form in rotary printing processes or transfer papers by means of transfer calenders, and the paper must be able to withstand the corresponding pulling forces that can act on papers during processing, even at low grammage.

The dye-sublimation paper according to the invention is further preferably characterised in that the base paper has a burst pressure (Mullen) of greater than 60 kPa, preferably of 100-160 kPa, at 25 $g/m^2$.

The dye-sublimation paper according to the invention is further preferably characterised in that the base paper has a burst pressure (Mullen) of greater than 85 kPa, preferably of 110-170 kPa, at 30 $g/m^2$.

The dye-sublimation paper according to the invention is further preferably characterised in that the base paper has a burst pressure (Mullen) of greater than 97 kPa, preferably of 130-200 kPa, at 35 $g/m^2$.

The burst pressure (Mullen) is determined here, for example, according to ISO 2758 (2014-12).

Such a burst pressure (Mullen) is advantageous because the burst pressure describes a strength value of the paper and the papers must be distinguished by high strengths even at low grammage weights. This is necessary in order to be able to use the paper without difficulty in the printing and finishing processes. For example, no wrinkles may form in rotary printing processes or transfer papers by means of transfer calenders, and the paper must be able to withstand the corresponding pulling forces that can act on papers during processing, even at low grammage.

The dye-sublimation paper according to the invention is further preferably characterised in that the base paper is a sized paper that contains at least one sizing agent selected from the group comprising resin size, alkenyl succinic anhydride, alkyl ketene dimer and/or synthetic sizing agent based on styrene acrylate.

Preferably, alkyl ketene dimer is contained as a sizing agent.

The dye-sublimation paper according to the invention is further preferably characterised in that the coating present on the first surface comprises at least one barrier component and/or a pigment.

The dye-sublimation paper according to the invention is further preferably characterised in that the coating present on the first surface comprises or consists of at least one barrier component selected from the group comprising starch, modified starch, starch derivatives, chemically and physically modified starch, carboxymethyl cellulose, cellulose derivatives, polyvinyl alcohol, polymers from the substance class of vinyl acetate polymers, or other effective constituents suitable as a barrier.

The dye-sublimation paper according to the invention is further preferably characterised in that the coating present on the first surface comprises or consists of pigments, especially inorganic pigments, such as silica or clay.

The dye-sublimation paper according to the invention is further preferably characterised in that the coating present on the first surface comprises at least one barrier component as defined above and at least one pigment as defined above.

The use of starch is especially preferred.

The pigments may include porous or non-porous pigments.

The barrier component is preferably present in this layer in the form of the above-mentioned polymers, especially in the case of starch derivatives or starches as well as polyvinyl alcohol, preferably in an amount of 80 to 100 wt. %, in relation to the total weight of the additional layer.

The barrier component is preferably present in this coating in the form of the above-mentioned pigments, preferably in an amount of 20 to 40 wt. %, in relation to the total weight of the coating.

The dye-sublimation paper according to the invention is further preferably characterised in that the areal application weight of the coating present on the first surface is 0.2 to 12 g/m$^2$, preferably 0.5 to 5 g/m$^2$.

Such an areal application weight has the advantage that the total weight of the paper is relatively low and thus supports the competitiveness of the product in the market. Furthermore, the manufacturing costs can be reduced with a smaller coating application.

The dye-sublimation paper according to the invention may also comprise further layers either on the second surface of the base paper and/or on the surface of the coating.

The dye-sublimation paper according to the invention is preferably distinguished by the fastest possible ink drying.

The present invention further relates to a method for producing a dye-sublimation paper, especially as described above for the second aspect, comprising a step of applying a coating, for binding and/or fixing a dye-sublimation dye, to a first surface of a base paper.

In this regard, all definitions and preferred embodiments for the dye-sublimation paper according to the second aspect also apply for the method described above.

The present invention further relates to a dye-sublimation paper obtainable by the method described above for the second aspect.

The present invention further relates to the use of a dye-sublimation paper as described above according to the first or the second aspect or obtainable according to the described method for printing on sheet materials, especially textiles.

The present invention also relates to a printed dye-sublimation paper comprising a dye-sublimation paper as described above according to the first or the second aspect or obtainable according to the method described, and a printed image with an ink area obtained from at least one solution containing at least one dye-sublimation dye, wherein the printed image has a uniformity of the ink area on a scale of 1 to 6 of at least 2.5, and/or wherein the solution containing at least one dye-sublimation dye has a dryness of at least 80%.

a) Shows a first hornified surface of a paper (front side/smooth side) in two resolutions (100× and 500×).

b) Shows the second surface of the same paper without hornification (back side/rough side) in two resolutions: (100× and 500×).

Figure 1A:
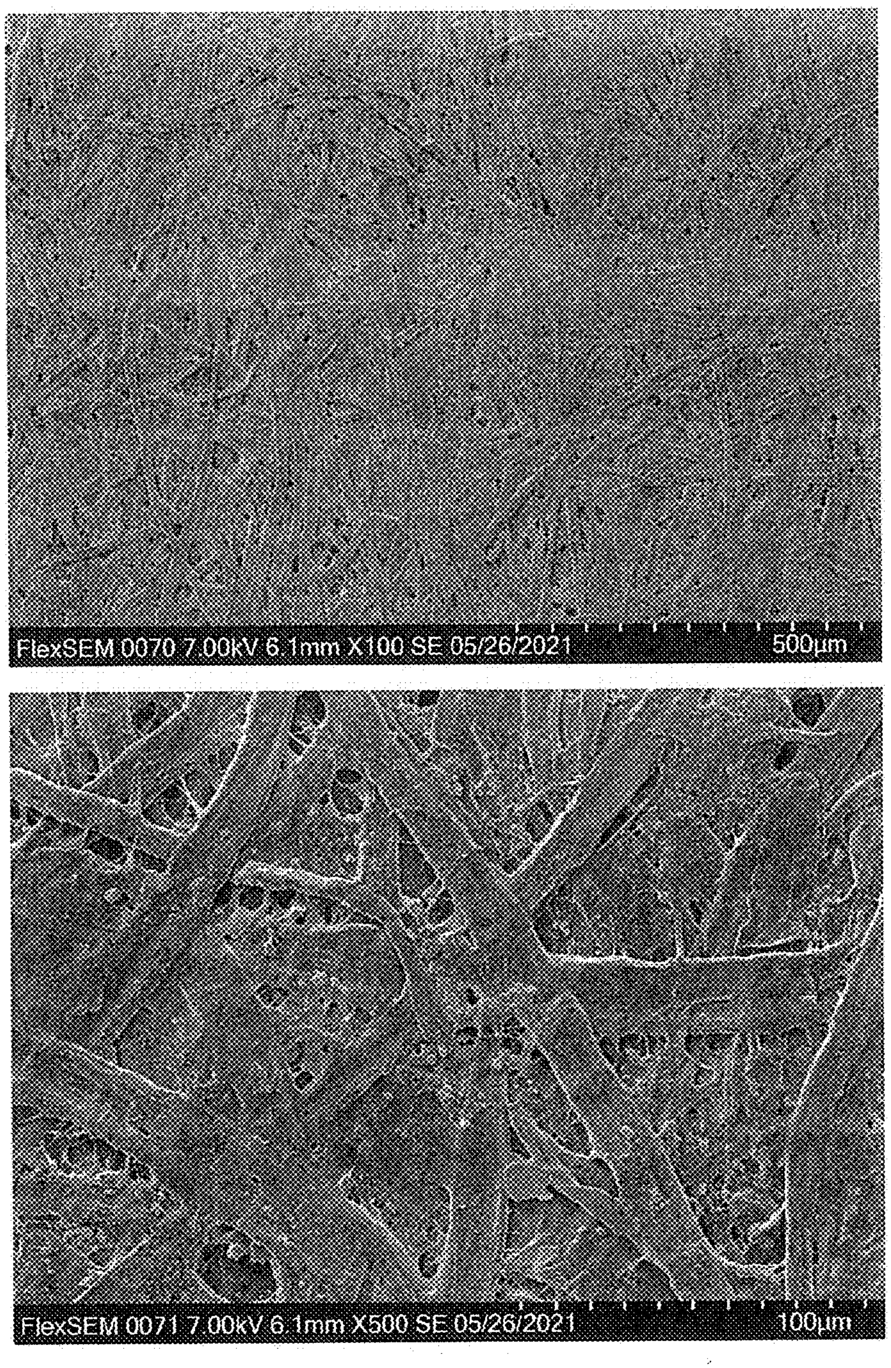
FIG. 1: Scanning electron micrographs of the first and second surfaces of a paper with a hornified and a non-hornified surface.
Figure 1B:
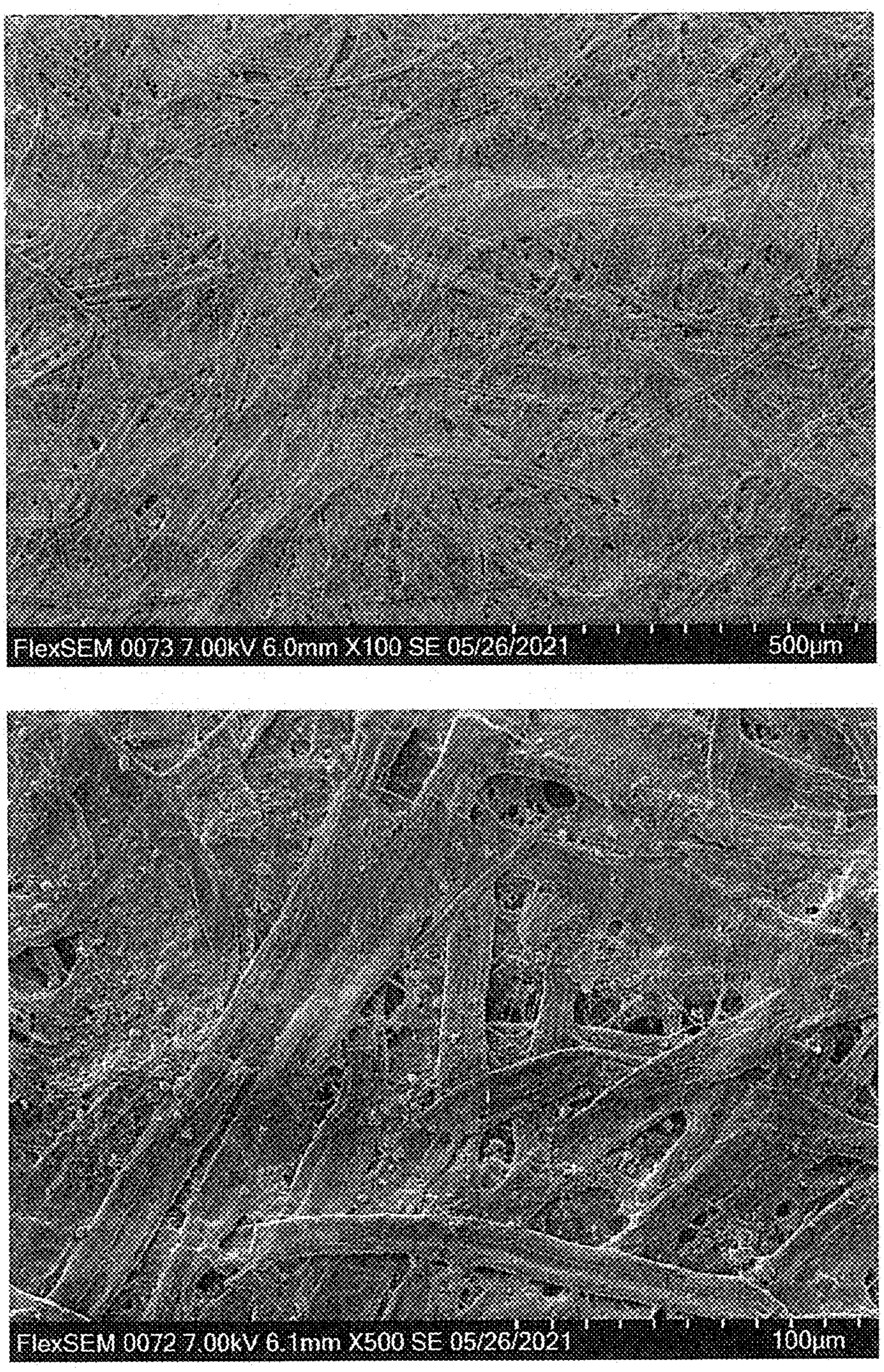
Figure 2:
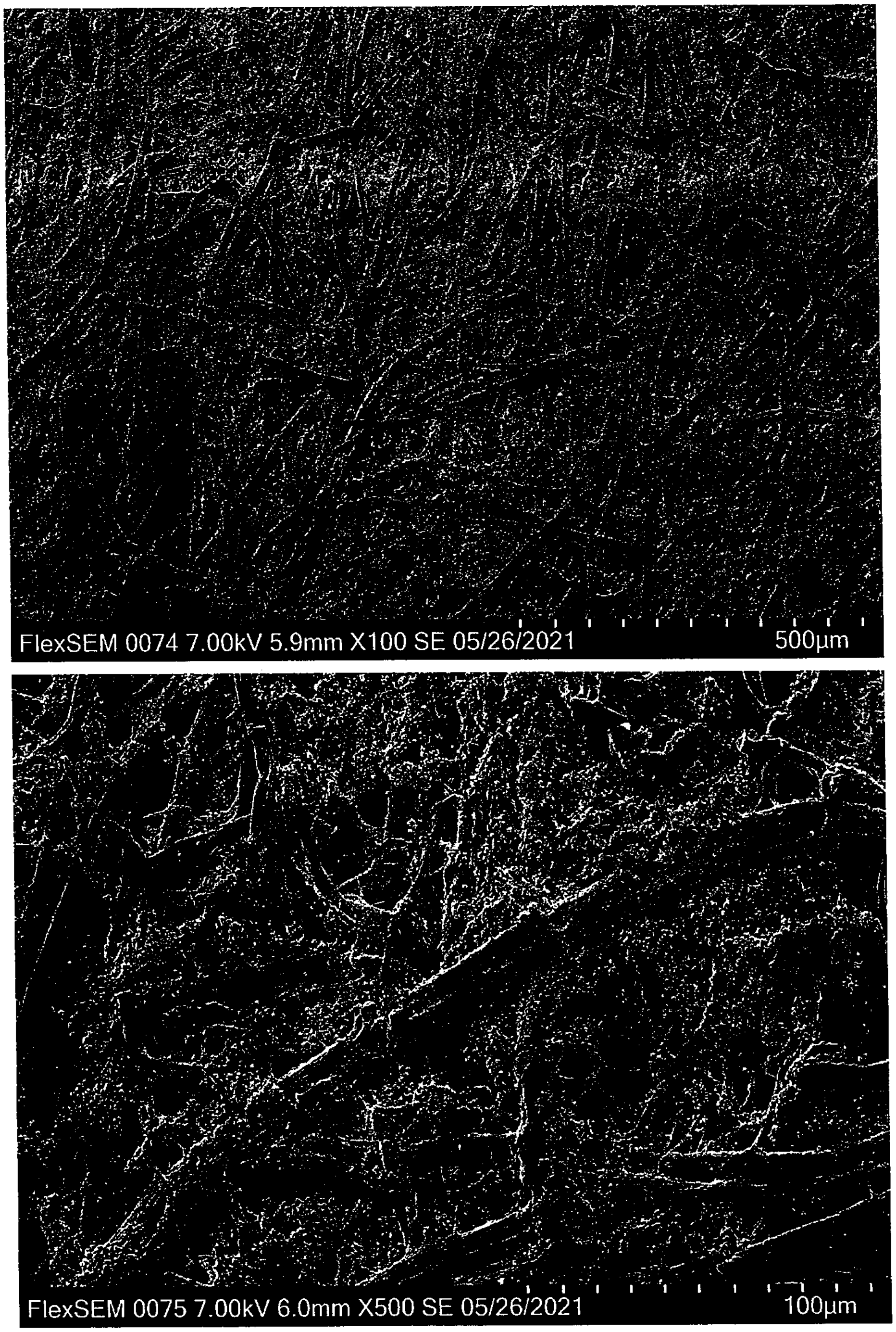

FIG. 2: Scanning electron micrographs of the first and second surfaces of a conventional paper (without hornification) in two resolutions: (100× and 500×).

In the following, the invention is explained in greater detail on the basis of non-limiting examples.

EXAMPLES

Two dye-sublimation papers according to the invention were produced, as follows, with a grammage of 22 g/m$^2$ and 25 g/m$^2$.

Production of the base paper in the corresponding grammage with one-sided smoothing via a Yankee cylinder in order to achieve the required hornification of the surface. Inline barrier application of, on average, approx. 0.9 g/m$^2$ thickness by means of a film press on the hornified side of the paper.

The two dye-sublimation papers according to the invention and the comparative examples were examined as follows:

4C colour printing with a Roland inkjet printer of the Texart RT-640 type using 3-Teck sublimation ink in CMYK colours, and of the J-Next Subly JXS-65 type. A test form was printed containing linear gradients of 0-100% area coverage, full-area and halftone-based colour areas, as well as photos.

The printed paper according to the invention was transferred to a polyester textile of the brand "TexStyles Mosaic" by means of a flatbed hot press from Sefa, type Rotex Pro V3 with 204° C. and 30 sec. dwell time.

The printed image was then assessed visually for uniformity of print, especially mottling. Mottling is understood to mean the non-uniformity of an ink area in the printed image.

A good print is expected to have an even, smooth and uniform print result.

If the print result is variable, uneven or cloudy to a greater or lesser extent, this is also referred to as mottling in professional jargon. Depending on the appearance of the print result, reference may also be made sometimes to a "grainy print", "blotchy print" or a streaky print result. All of these quality-reducing print results are especially bothersome when printing full areas, but can also look unpleasant in smooth, uniform halftone regions.

Tips for Avoidance:

Very often, uneven and cloudy print results are due to poor paper quality, especially in the case of coated papers.

Quality of the coated paper with a wipe test ink (Lorilleux porometer test ink no. 1520 (dark grey) or wipe test ink VU.

The cloudiness (mottling) was determined using a "cloud-runner" from the manufacturer "BYK-Instruments" according to the manufacturer's specifications.

In addition, an X-Rite densitometer of the i1 Pro type was used to measure the logarithmic optical densities (D·log).

In addition, the drying properties of the dye-sublimation papers were examined as follows:

Place an unprinted dye-sublimation paper, with the base paper side facing upwards, into the cold press.

Two minutes after printing starts, place the printed side on the paper in the cold press.

Close the press for 10 seconds.

Peel off the printed sheet and evaluate the absorption on the unprinted sheet, using a template.

The last field still visible of the particular row is counted or scored.

For this purpose, a test form with different test fields is used, which contain different levels of colour coverage. Five rows with 13 fields each are printed.

Row 1: (two colours) The colour quantity of magenta and yellow starts at 100% and decreases by 4% with each field down to 52%.

Row 2: (two colours) The colour quantity of cyan and yellow starts at 100% and decreases by 4% with each field down to 52%.

Row 3: (two colours) The amount of colour of cyan and magenta starts at 100% and decreases by 4% with each field until it reaches 52

Row 4: (three colours) The colour quantity of cyan, magenta and yellow starts at 100% and decreases by 4% with each field down to 52%.

Row 5: (four colours) The colour quantity of cyan, magenta, yellow and black starts at 100% and decreases by 4% with each field down to 52%.

The dye-sublimation papers listed in Table 2 were used as comparisons.

The comparative examples all have a higher grammage, no hornified surface, but a further layer for binding and/or fixing the dye-sublimation dye.

The results are summarised in the following tables.

TABLE 1

| Specifications | | Standard | Unit | | |
|---|---|---|---|---|---|
| Grammage | | ISO 536 | g/m$^2$ | 22 | 25 |
| Thickness | | ISO 534 | μm | 31 | 34 |
| White R 457 | | ISO 2470 | % | 83 | 84 |
| Roughness | OS | ISO8791-4 | μm | 3.8 | 3.8 |
| | RS | ISO 8791-4 | μm | 7 | 7 |
| Breaking resistance | longitudinal | ISO 1924-2 | N/15 mm | ≥18 | ≥22 |
| | transverse | ISO 1924-2 | N/15 mm | ≥10 | ≥12 |
| Elongation at break | longitudinal | ISO 1924-2 | % | ≥1.5 | ≥1.5 |
| | transverse | ISO 1924-2 | % | ≥3.5 | ≥3.5 |
| Burst pressure (Mullen) | | ISO 2758 | kPa | ≥55 | ≥60 |

TABLE 2

| | Mass per unit area | Textile mottling [1 = very good/ 6 = strong] | Optical density (D · log) Cyan optical density on textile | Magenta optical density on textile | Yellow optical density on textile | Black optical density on textile |
|---|---|---|---|---|---|---|
| | | | min | | | |
| | [g/m$^2$] | Images | 1.40 | 1.40 | 1.40 | 1.45 |
| Example 1 | 22 | 1.50 | 1.56 | 1.52 | 1.48 | 1.58 |
| Example 2 | 25 | 2 | 1.56 | 1.50 | 1.46 | 1.55 |
| Comparative examples: | | | | | | |
| Koehler/Beaver TexPrint Moda 39 | 41.6 | 1 | 1.56 | 1.49 | 1.49 | 1.56 |
| Koehler/Beaver TexPrint Moda 58 | 58 | 1 | 1.58 | 1.49 | 1.47 | 1.55 |
| Koehler/Beaver TexPrint MP 95 | 96 | 1 | 1.57 | 1.50 | 1.51 | 1.55 |
| Koehler/Beaver TexPrint XP 105 | 102 | 1 | 1.59 | 1.49 | 1.51 | 1.55 |
| Koehler/Beaver TexPrint DT heavy (R) | 113 | 2 | 1.48 | 1.35 | 1.46 | 1.46 |
| Koehler/Beaver TexPrint Sports Plus 92 | 93 | 1 | 1.57 | 1.51 | 1.49 | 1.55 |
| Neenah-Coldenhove JETCOL HS 95 | 96 | 1 | 1.59 | 1.51 | 1.50 | 1.55 |
| Sappi Transjet Boost 85 | 86 | 1 | 1.58 | 1.51 | 1.50 | 1.57 |
| Sappi Transjet Eco II | 96 | 1 | 1.61 | 1.53 | 1.51 | 1.58 |
| Kaspar 45 Superlite | 46 | 1 | 1.58 | 1.49 | 1.49 | 1.56 |
| Sappi Transjet Fashion 45 | 47 | 1 | 1.57 | 1.48 | 1.47 | 1.55 |
| Sappi Transjet Sportsline 100 | 104 | 1 | 1.58 | 1.51 | 1.50 | 1.56 |

TABLE 2-continued

| | Solution containing dye-sublimation dye (ink drying on dye-sublimation paper (%)) | | | | |
| --- | --- | --- | --- | --- | --- |
| | Ink drying mixed colours (start of deposit; higher = better) [%] | Ink drying mixed colours (start of deposit; higher = better) [%] | Ink drying mixed colours (start of deposit; higher = better) [%] | Ink drying mixed colours (start of deposit; higher = better) [%] | Ink drying mixed colours (start of deposit; higher = better) [%] |
| | Solution containing dye-sublimation dye (ink drying) mixed colours (start of deposit; higher = better) [%] | | | | |
| Example 1 | 92 | 92 | 88 | 88 | 84 |
| Example 2 | 88 | 92 | 88 | 84 | 84 |
| Comparative examples: | | | | | |
| Koehler/Beaver TexPrint Moda 39 | 96 | 96 | 92 | 92 | 88 |
| Koehler/Beaver TexPrint Moda 58 | 96 | 96 | 92 | 88 | 88 |
| Koehler/Beaver TexPrint MP 95 | 96 | 96 | 96 | 92 | 88 |
| Koehler/Beaver TexPrint XP 105 | 96 | 96 | 96 | 92 | 88 |
| Koehler/Beaver TexPrint DT heavy (R) | 100 | 100 | 100 | 100 | 100 |
| Koehler/Beaver TexPrint Sports Plus 92 | 92 | 92 | 92 | 88 | 88 |
| Neenah-Coldenhove JETCOL HS 95 | 96 | 96 | 96 | 92 | 88 |
| Sappi Transjet Boost 85 | 96 | 96 | 96 | 92 | 92 |
| Sappi Transjet Eco II | 96 | 96 | 96 | 92 | 88 |
| Kaspar 45 Superlite | 92 | 92 | 96 | 92 | 88 |
| Sappi Transjet Fashion 45 | 92 | 92 | 92 | 88 | 84 |
| Sappi Transjet Sportsline 100 | 96 | 96 | 96 | 92 | 92 |

It was also shown that the final quality of the dye-sublimation papers according to the invention on the textile is comparable to that of conventional pigment-coated dye-sublimation papers. There is no C2C bleeding (colour to colour bleeding), no feathering (colour bleeding to unprinted regions) and a brilliant colour reproduction with very good colour density values (D·log). In addition, the images showed even areas and gradients.

The invention claimed is:

1. A dye-sublimation paper for printing with a solution containing at least one dye-sublimation dye, comprising a base paper having a first surface and a second surface opposite the first surface, characterised in that the first surface is a hornified surface, in that a layer for binding and/or fixing the dye-sublimation dye is applied to the first surface, and in that the dye-sublimation paper has a roughness on the coated side of ≤4.5 μm, measured according to ISO 8791-4, and a grammage of ≤30 g/m$^2$, measured according to ISO 536.

2. The dye-sublimation paper according to claim 1, characterised in that the dye-sublimation paper has a roughess on the second surface side of >6 μm, measured according to ISO 8791-4.

3. The dye-sublimation paper according to claim 1, characterised in that a surface of the base paper forming the first surface has a roughness of ≤4.5 μm, measured according to ISO 8791-4.

4. The dye-sublimation paper according to claim 1, characterised in that the due-sublimation paper has a Bendtsen porosity of ≤500 ml/min, measured according to ISO5636-3.

5. The dye-sublimation paper according to claim 1, characterised in that the base paper has a Bendtsen porosity of >500 ml/min, measured according to ISO5636-3.

6. The dye-sublimation paper according to claim 1, characterised in that the base paper has a grammage of 15 to 29.9 g/m$^2$.

7. The dye-sublimation paper according to claim 1, characterised in that the dye-sublimation paper has a breaking length of l/q of 6000-13000/3000-8000 (m), at 25 g/m$^2$, or a breaking length of l/q of 6000-13000/3000-8000 (m), at 30 g/m$^2$, or a breaking length of l/q of 6000-13000/3000-8000 (m), at 35 g/m$^2$.

8. The dye-sublimation paper according to claim 1, characterised in that the dye-sublimation paper has a burst pressure (Mullen) greater than 60 kPa, at 25 g/m$^2$, or greater than 85 kPa, at 30 g/m$^2$, or greater than 97 kPa, at 35 g/m$^2$.

9. The dye-sublimation paper according to claim 1, characterised in that the base paper is a sized paper that contains at least one sizing agent selected from the group comprising resin size, alkenyl succinic anhydride, alkyl ketene dimer and/or synthetic sizing agent based on styrene acrylate.

10. The dye-sublimation paper according to claim 1, characterised in that a further layer present on the first surface comprises at least one barrier component selected from the group comprising starch, modified starch, starch derivatives, chemically and physically modified starch, carboxymethyl cellulose, cellulose derivatives, polyvinyl alcohol, polymers from the substance class of vinyl acetate polymers, or other effective constituents suitable as a barrier and/or pigments including silica or clay.

11. The dye-sublimation paper according to claim 10, characterised in that the pigments comprise porous or non-porous pigments.

12. The dye-sublimation paper according to claim 1, characterised in that an areal application weight of a further layer is 0.2 to 12 g/m$^2$.

13. A method for producing a dye-sublimation paper according to claim 1, comprising the steps of smoothing and hornifying a first surface of a base paper on one side and applying a further layer, for binding and/or fixing a dye-sublimation dye, to said first surface.

14. The dye-sublimation paper obtainable according to the method of claim 13.

15. A dye-sublimation paper for printing with a solution containing at least one dye-sublimation dye, comprising a base paper having a first surface and a second surface opposite the first surface, characterised in that the first surface has a coating for binding and/or fixing the dye-sublimation dye, and in that the dye-sublimation paper has a roughness on the coated side of ≤4.5 μm, measured according to ISO8791-4 and a grammage of ≤30 g/m$^2$.

16. The dye-sublimation paper according to claim 15, characterised in that the second surface has a roughness of >6 μm, measured according to ISO8791-4.

17. The dye-sublimation paper according to claim 15, characterised in that the dye-sublimation paper has a Bendtsen porosity of <500 ml/min, measured according to ISO5636-3.

18. The dye-sublimation paper according to claim 15, characterised in that the base paper has a grammage of 17 to 29.9 g/m$^2$.

19. The dye-sublimation paper according to claim 1, characterised in that the dye-sublimation paper has a breaking length of l/q of 9000-12000/4000-7000 (m) at 25 g/m$^2$, or a breaking length of l/1 of 9000-12000/4000-7000 (m) at 30 g/m$^2$, or a breaking length of l/q of 9000-12000/4000-7000 (m) at 35 g/m$^2$.

20. The dye-sublimation paper according to claim 1, characterised in that the dye-sublimation paper has a burst pressure (Mullen) of 100-160 kPa at 25 g/m$^2$, or 110-170 kPa at 30 g/m$^2$, or 130-200 kPa at 35 g/m$^2$.

* * * * *